United States Patent
Otogawa et al.

(10) Patent No.: US 12,286,170 B2
(45) Date of Patent: Apr. 29, 2025

(54) STEERING-ANGLE CONTROL APPARATUS

(71) Applicant: DENSO CORPORATION, Kariya (JP)

(72) Inventors: Yuusuke Otogawa, Kariya (JP); Motoaki Kataoka, Kariya (JP); Haruo Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 434 days.

(21) Appl. No.: 17/821,499

(22) Filed: Aug. 23, 2022

(65) Prior Publication Data

US 2022/0402542 A1 Dec. 22, 2022

Related U.S. Application Data

(63) Continuation of application No. PCT/JP2021/002048, filed on Jan. 21, 2021.

(30) Foreign Application Priority Data

Feb. 28, 2020 (JP) ................. 2020-033629

(51) Int. Cl.
*B62D 5/04* (2006.01)
*B62D 6/00* (2006.01)

(52) U.S. Cl.
CPC ........... *B62D 5/0463* (2013.01); *B62D 6/008* (2013.01)

(58) Field of Classification Search
None
See application file for complete search history.

(56) References Cited

U.S. PATENT DOCUMENTS

| | | | | |
|---|---|---|---|---|
| 2018/0339728 A1* | 11/2018 | Hamada | ............... | B62D 15/025 |
| 2018/0370561 A1* | 12/2018 | Tsubaki | ............... | B62D 5/0463 |
| 2019/0168805 A1* | 6/2019 | Siskoy | ............... | B60W 30/095 |
| 2020/0255055 A1* | 8/2020 | Takase | ............... | B62D 5/0409 |

FOREIGN PATENT DOCUMENTS

JP 3745154 B2 2/2006

\* cited by examiner

*Primary Examiner* — Lail A Kleinman
(74) *Attorney, Agent, or Firm* — Maschoff Brennan

(57) ABSTRACT

A steering-angle control apparatus controls a steering mechanism based on a state command value, which is input in each predetermined period. An interpolation unit interpolates between a previous value and a current value of the input state command value to compute a state interpolation value in an interpolation period, which is shorter than the predetermined period. An interpolation-value determination unit determines whether the state interpolation value is an abnormal value. A control unit controls the steering mechanism based on the state interpolation value computed by the interpolation unit when the interpolation-value determination unit determines that the state interpolation value is not an abnormal value, and controls the steering mechanism based on the current value of the state command value when the interpolation-value determination unit determines that the state interpolation value is an abnormal value.

10 Claims, 4 Drawing Sheets

STEERING-ANGLE CONTROL APPARATUS

CROSS REFERENCE TO RELATED APPLICATION

The present application is a continuation application of International Patent Application No. PCT/JP2021/002048 filed on Jan. 21, 2021, which designated the U.S. and claims the benefit of priority from Japanese Patent Application No. 2020-033629 filed on Feb. 28, 2020. The entire disclosures of all of the above applications are incorporated herein by reference.

TECHNICAL FIELD

The present disclosure relates to a steering-angle control apparatus that is configured to control a steering mechanism.

BACKGROUND

Conventionally, there is an automatic steering apparatus that is configured to control a steering angle of a steering mechanism of a vehicle.

SUMMARY

According to an aspect of the present disclosure, a steering-angle control apparatus is configured to control a steering mechanism based on a state command value input in each predetermined period.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
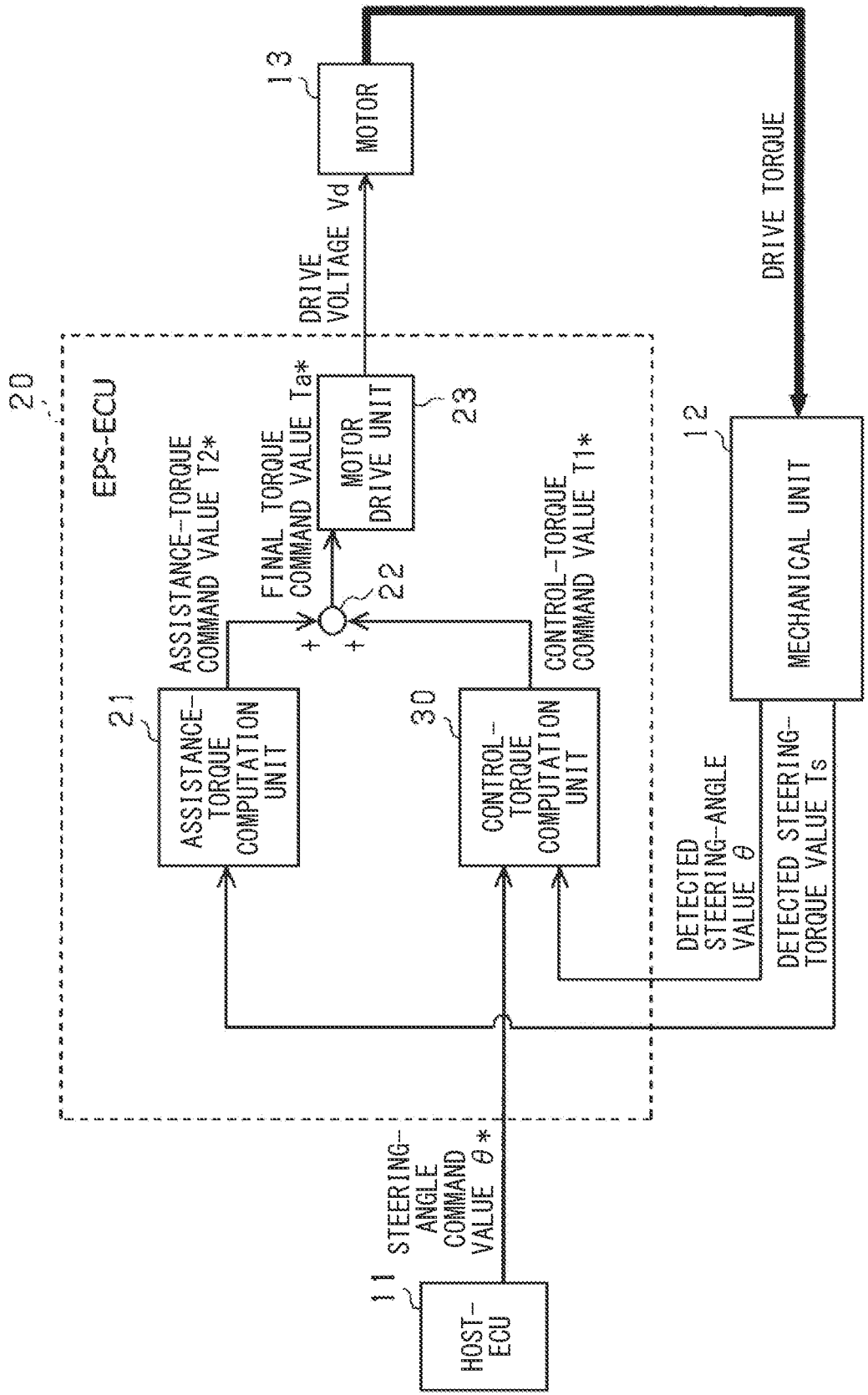
FIG. 1 is a block diagram illustrating a steering-angle control apparatus and its peripheral configuration.

As follows, examples of the present embodiment will be described.

According to an example of the present disclosure, an automatic steering apparatus interpolates between steering-angle command values input in each predetermined period, computes a target steering-angle value in an interpolation period shorter than the predetermined period, and controls a steering angle of a steering mechanism based on the computed target steering-angle value. With this configuration, even with a large difference between the steering-angle command values given one after another, a steering angle can be smoothly changed, and a vehicle exhibits no wobbling behavior.

In the meantime, when a state command value such as a steering-angle command value or a target steering-angle value is an abnormal value, the automatic steering apparatus having the above-described configuration may probably control a steering angle of the steering mechanism based on the abnormal value. In this case, there is a fear that a steering angle controlled by the steering mechanism may be controlled to an abnormal steering angle.

According to an example of the present disclosure, a steering-angle control apparatus that controls a steering mechanism based on a state command value input in each predetermined period, includes: an interpolation unit that interpolates between a previous value and a current value of the input state command value to compute a state interpolation value in an interpolation period shorter than the predetermined period; an interpolation-value determination unit that determines whether the state interpolation value is an abnormal value; and a control unit that controls the steering mechanism based on the state interpolation value computed by the interpolation unit when the interpolation-value determination unit determines that the state interpolation value is not an abnormal value, and controls the steering mechanism based on the current value of the state command value when the interpolation-value determination unit determines that the state interpolation value is an abnormal value.

With the above-described configuration, the steering-angle control apparatus controls the steering mechanism based on the state command value input in each predetermined period. The interpolation unit interpolates between the previous value and the current value of the input state command value to compute the state interpolation value in the interpolation period shorter than the predetermined period. Thus, a difference between the state interpolation values can be made smaller than a difference between the previous value and the current value of the state command value.

The interpolation-value determination unit determines whether the state interpolation value is an abnormal value. The control unit controls the steering mechanism based on the state interpolation value computed by the interpolation unit when the interpolation-value determination unit determines that the state interpolation value is not an abnormal value. Thus, a steering angle controlled by the steering mechanism can be smoothly changed.

Further, the control unit controls the steering mechanism based on the current value of the state command value when the interpolation-value determination unit determines that the state interpolation value is an abnormal value. Thus, though a change in a steering angle may probably be slightly less smooth, a steering angle controlled by the steering mechanism can be prevented from being controlled to an abnormal steering angle.

The interpolation unit needs to store the computed state interpolation value in a storage unit in which data is stored. However, due to breakdown of the storage unit, for example, the state interpolation value may probably be an abnormal value.

In this regard, according to a second example, a first storage unit in which data is stored and a second storage unit in which data is stored are included, the interpolation unit stores the computed state interpolation value in the first storage unit and the second storage unit, and the interpolation-value determination unit determines that the state interpolation value is an abnormal value when it is determined that the state interpolation value in a predetermined n-th place read from the first storage unit does not match the state interpolation value in the predetermined n-th place read from the second storage unit.

With the above-described configuration, the steering-angle control apparatus includes the first storage unit in which data is stored and the second storage unit in which data is stored. The interpolation unit stores the computed state interpolation value in the first storage unit and the second storage unit. That is, the same state interpolation value computed by the interpolation unit is stored in the first storage unit and the second storage unit. The interpolation-value determination unit determines that the state interpolation value is an abnormal value when it is determined that a state interpolation value in a predetermined n-th place read from the first storage unit does not match a state interpolation value in the predetermined n-th place read from the second storage unit. Thus, in a case where the first storage unit or the second storage unit is broken down, or in a case where a trouble occurs in storage or reading of a state interpolation value in/from the first storage unit or the second storage unit, it can be determined that the state interpolation value is an abnormal value. Therefore, a steering angle controlled by the steering mechanism can be prevented from being controlled to an abnormal steering angle.

Further, there can be employed a configuration as in a third example, in which the interpolation-value determination unit uses, as a division number, a value obtained by dividing the predetermined period by the interpolation period, determines that the state interpolation value is an abnormal value when an amount of change in the state interpolation value computed by the interpolation unit in the interpolation period is larger than a limit value obtained by dividing an absolute value of a difference between the current value and the previous value of the state command value by the division number, and determines that the state interpolation value is not an abnormal value when the amount of change is equal to or smaller than the limit value.

Also in a case where the interpolation-value determination unit determines that the state interpolation value is not an abnormal value, an amount of change in the state interpolation value in the interpolation period for computing the state interpolation value may probably be unusually large. In this case, there is a fear of abrupt change in a steering angle controlled by the steering mechanism.

In this regard, according to a fourth example, there is further included a limiting unit that uses, as a division number, a value obtained by dividing the predetermined period by the interpolation period and limits an amount of change in the state interpolation value computed by the interpolation unit in the interpolation period, to a limit value obtained by dividing an absolute value of a difference between the current value and the previous value of the state command value by the division number, at maximum.

With the above-described configuration, even with an unusually large amount of change in the state interpolation value computed by the interpolation unit in the interpolation period, the amount of change can be limited to the limit value at maximum. Thus, a steering angle controlled by the steering mechanism can be prevented from being controlled to an abnormal steering angle. Further, a value obtained by dividing the predetermined period by the interpolation period is used as a division number, and the limit value is a value obtained by dividing an absolute value of a difference between the current value and the previous value of the state command value by the division number. Thus, the amount of change in the state interpolation value can be limited to an amount of change in a case where the state interpolation value is changed from the previous value to the current value of the state command value at a constant change rate, at maximum. Therefore, in the predetermined period, a steering angle can be smoothly changed, and a steering angle controlled by the steering mechanism can be made as close as possible to the steering angle corresponding to the current value of the state command value.

According to a fifth example, a steering-angle control apparatus that controls a steering mechanism based on a state command value input in each predetermined period, includes: an interpolation unit that interpolates between a previous value and a current value of the input state command value to compute a state interpolation value in an interpolation period shorter than the predetermined period; a limiting unit that uses, as a division number, a value obtained by dividing the predetermined period by the interpolation period and limits an amount of change in the state interpolation value computed by the interpolation unit in the interpolation period, to a limit value obtained by dividing an absolute value of a difference between the current value and the previous value of the state command value by the division number, at maximum; and a control unit that controls the steering mechanism based on the state interpolation value of which amount of change is limited by the limiting unit, the state interpolation value being computed by the interpolation unit.

With the above-described configuration, a steering angle controlled by the steering mechanism can be prevented from being controlled to an abnormal steering angle in the same manner as in the case with the fourth example. Further, in the predetermined period, a steering angle can be smoothly changed, and a steering angle controlled by the steering mechanism can be made as close as possible to the steering angle corresponding to the current value of the state command value.

In some cases, not only a first state command value, but also a second state command value computed separately from the first state command value, is input to the steering-angle control apparatus in each predetermined period. The steering mechanism is controlled by the first state command value and the second state command value. In such a case, when the first state command value is an abnormal value, it is how to control the steering mechanism based on the first state command value and the second state command value, that matters.

In this regard, according to a sixth example, the state command value is a first state command value, a second state command value computed separately from the first state command value is input to the steering-angle control apparatus, a command-value determination unit that determines whether the first state command value is an abnormal value is included, and when the command-value determination unit determines that the first state command value is not an abnormal value, the steering mechanism is controlled based on the first state command value and the second state command value, and when the command-value determination unit determines that the first state command value is an abnormal value, the steering mechanism is controlled not based on the first state command value, but based on the second state command value.

With the above-described configuration, the steering-angle control apparatus controls the steering mechanism based on the first state command value and the second state command value when the command-value determination unit determines that the first state command value is not an abnormal value. Thus, the first state command value and the second state command value can be reflected in control of the steering mechanism. On the other hand, the steering-angle control apparatus controls the steering mechanism not based on the first state command value, but based on the second state command value when the command-value determination unit determines that the first state command value is an abnormal value. Thus, when it is determined that the first state command value is an abnormal value, it is possible to continue controlling the steering mechanism based on the second state command value while preventing a steering angle controlled by the steering mechanism based on the first state command value from being controlled to an abnormal steering angle.

More specifically, there can be employed a configuration as in a seventh example, in which the state command value is a steering-angle command value that indicates a steering angle to be controlled by the steering mechanism.

More specifically, there can be employed a configuration as in an eighth example, in which the steering mechanism includes a mechanical unit and a motor that drives the mechanical unit, and the state command value is a torque command value that indicates torque to be generated by the motor.

Hereinafter, an embodiment in which the present disclosure is embodied by a steering-angle control apparatus mounted on a vehicle will be described with reference to the drawings.

As illustrated in FIG. 1, the vehicle includes a host-electronic control unit (ECU) 11, an electric power steering (EPS)-ECU 20, and a mechanical unit 12 and a motor 13 of a steering mechanism.

The host-ECU 11 includes a microcomputer including a CPU, a ROM, a RAM, a storage device, an input/output interface, and the like. The host-ECU 11 controls the vehicle in a centralized manner. The host ECU 11 outputs a steering-angle command value $\theta^*$ (state command value, first state command value) to the EPS-ECU 20 in each predetermined period Te in response to output signals from various sensors of the vehicle. The predetermined period Te is, for example, 10 [ms]. The host-ECU 11 outputs the steering-angle command value $\theta^*$ to automatically control the steering mechanism based on a result of detecting a guidance marker such as a magnetic nail buried in a road, road information of a car navigation system, a route to a destination, and the like, for example. The predetermined period Te is not limited to 10 [ms], and may be a period shorter than 10 [ms] or a period longer than 10 [ms].

The EPS-ECU 20 (steering-angle control apparatus) includes a microcomputer including a CPU, a ROM, a RAM, a storage device, a drive circuit, an input/output interface, and the like. The EPS-ECU 20 controls the steering mechanism based on the steering-angle command value $\theta^*$, a detected steering-torque value Ts, and a detected steering-angle value $\theta$. The steering-angle command value $\theta^*$ is input from the host-ECU 11 to the EPS-ECU 20 in each predetermined period Te. The detected steering-torque value Ts is torque applied to the mechanical unit 12 of the steering mechanism based on a driver's operation on a steering wheel of the vehicle, and is detected by a torque sensor provided in the mechanical unit 12, for example. The detected steering-angle value $\theta$ is a steering angle of a steering wheel operated by the steering mechanism, and is detected by a steering-angle sensor provided in the mechanical unit 12, for example.

The steering mechanism includes the mechanical unit 12 and the motor 13. The mechanical unit 12 has a known configuration including a steering shaft, a housing, a tie rod, a knuckle arm, and the like. The motor 13 is, for example, a three-phase brushless motor or the like. The motor 13 is driven by a drive voltage Vd output from the EPS-ECU 20 to drive the mechanical unit 12. Upon driving of the mechanical unit 12, a steering angle of the steering wheel of the vehicle is controlled (changed).

The EPS-ECU 20 performs functions of an assistance-torque computation unit 21, a control-torque computation unit 30, an addition circuit 22, a motor drive unit 23, and the like.

The assistance-torque computation unit 21 computes an assistance-torque command value T2* based on the detected steering-torque value Ts (second state command value) as input. The assistance-torque command value T2* is torque that assists (supports) a driver in his steering operation. For example, the assistance-torque computation unit 21 computes the assistance-torque command value T2* corresponding to the detected steering-torque value Ts, based on a map or the like in which a relationship between the detected steering-torque value Ts and the assistance-torque command value T2* is set in advance.

The control-torque computation unit 30 computes a control-torque command value T1* based on the steering-angle command value $\theta^*$ and the detected steering-angle value $\theta$ that are input in each predetermined period Te. The control-torque command value T1* is torque for automatically controlling the mechanical unit 12 of the steering mechanism in accordance with an instruction from the host-ECU 11.

The addition circuit 22 computes an addition value of the assistance-torque command value T2* and the control-torque command value T1*, and outputs the computed addition value to the motor drive unit 23 as a final torque command value Ta*.

The motor drive unit 23 controls the drive voltage Vd applied to the motor 13 based on the final torque command value Ta* input from the addition circuit 22. For example, the motor drive unit 23 performs pulse width modulation (PWM) control on the drive voltage Vd while bringing the drive voltage Vd into correspondence with the input final torque command value Ta*, based on a map or the like in which a relationship between the final torque command value Ta* and the drive voltage Vd is set in advance.

The motor 13 is driven by the applied drive voltage Vd, to impart drive torque to the mechanical unit 12. The drive torque is torque corresponding to the final torque command value Ta* obtained by addition of the assistance-torque command value T2* and the control-torque command value T1*. Thus, the steering mechanism is under control in which the assistance-torque command value T2* and the control-torque command value T1* are reflected. As a result, the steering mechanism controls a steering angle of the steering wheel of the vehicle to a steering angle that reflects the driver's steering operation and the steering-angle command value $\theta^*$.

Figure 2:
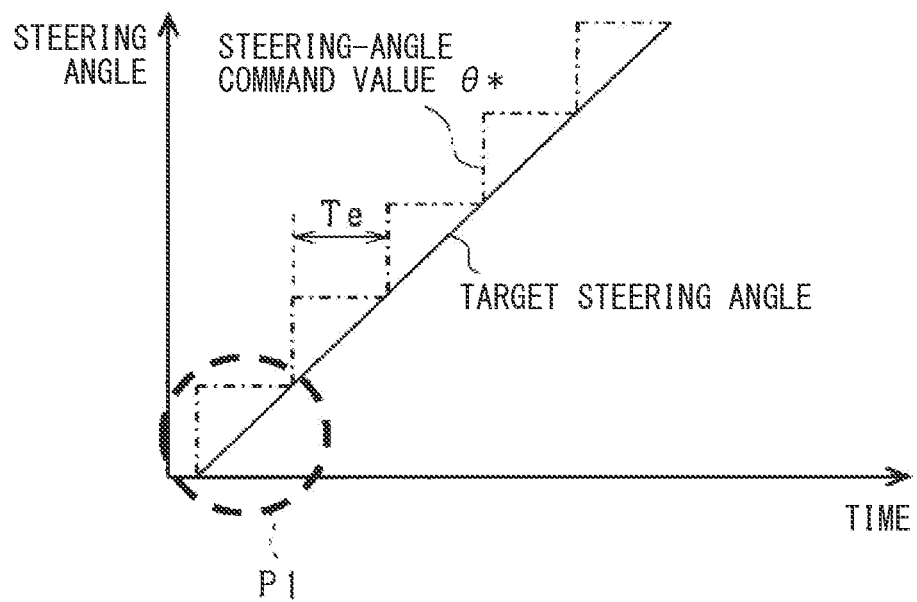
FIG. 2 is a time chart illustrating a relationship between a steering-angle command value and a target steering angle.

As illustrated in FIG. 2, the control-torque computation unit 30 interpolates between a previous value and a current value of the steering-angle command value $\theta^*$ input in each predetermined period Te, and computes a target steering angle (state interpolation value) in an interpolation period Tes shorter than the predetermined period Te.

Figure 3:
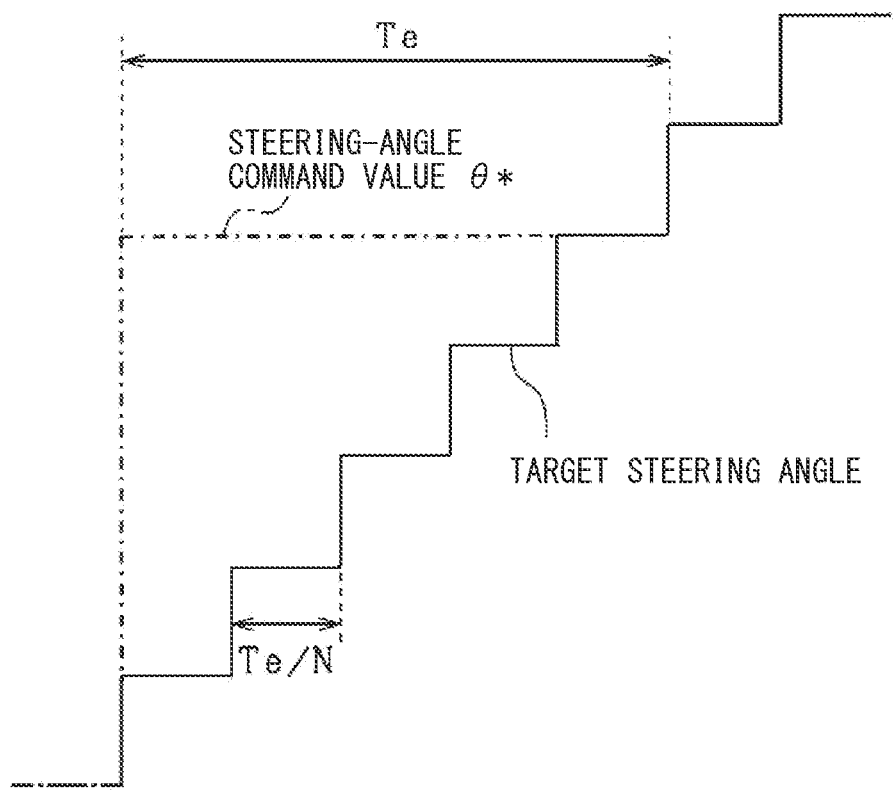
FIG. 3 is an enlarged view of a portion P1 in FIG. 2.

FIG. 3 is an enlarged view of a portion P1 in FIG. 2. As illustrated in FIG. 3, a target steering angle is computed in each Te/N obtained by division of the predetermined period Te by a division number N. The division number N=5, for example. That is, Tes=Te/N, and N=Te/Tes. The target steering angle changes more finely (smoothly) than the steering-angle command value $\theta^*$. The division number N is not limited to five, and may be a natural number of four or six or more.

Figure 4:
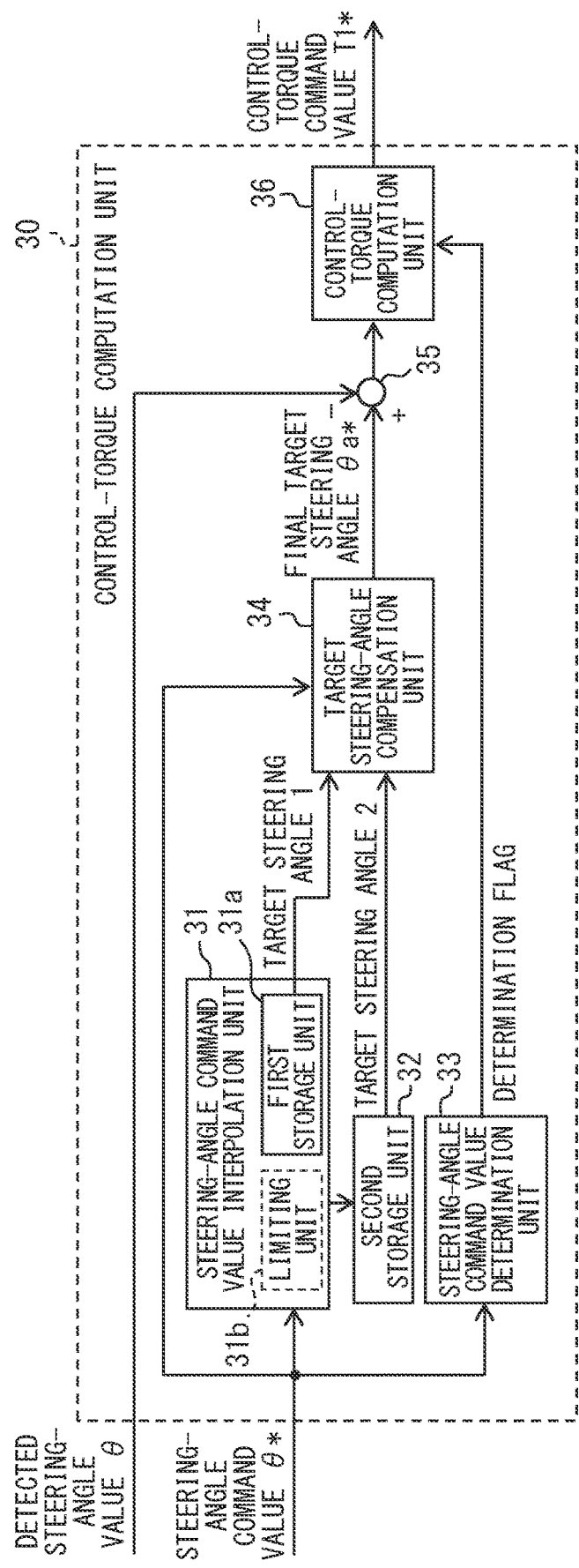
FIG. 4 is a block diagram illustrating a configuration of a control-torque computation unit in FIG. 1.

FIG. 4 is a block diagram illustrating a configuration of the control-torque computation unit 30 in FIG. 1. The control-torque computation unit 30 performs functions of a steering-angle command value interpolation unit 31, a second storage unit 32, a steering-angle command value determination unit 33, a target steering-angle compensation unit 34, a subtraction circuit 35, a control-torque computation unit 36, and the like. The second storage unit 32 includes a memory (RAM) and stores data therein.

The steering-angle command value interpolation unit 31 (interpolation unit) interpolates between a previous value θ*(n−1) and a current value θ*(n) of the steering-angle command value θ* input in each predetermined period Te, and computes a target steering angle in the interpolation period Tes. More specifically, the steering-angle command value interpolation unit 31 changes a target steering angle from the previous value θ*(n−1) to the current value θ*(n) of the steering-angle command value θ* by {θ*(n)−θ*(n−1)}/N in each interpolation period Tes.

The steering-angle command value interpolation unit 31 includes a first storage unit 31a in which data is stored. The first storage unit 31a includes a memory (RAM) different from the memory of the second storage unit 32. The steering-angle command value interpolation unit 31 stores a series of target steering angles changing from the previous value θ*(n−1) to the current value θ*(n) of the steering-angle command value θ*, in the first storage unit 31a and the second storage unit 32.

The steering-angle command value θ* is input to the steering-angle command value determination unit 33 (command-value determination unit). The steering-angle command value determination unit 33 determines whether the input steering-angle command value θ* is an abnormal value. More specifically, the steering-angle command value determination unit 33 determines that the steering-angle command value θ* is an abnormal value when an absolute value of a difference between the current value θ*(n) and the previous value θ*(n−1) of the steering-angle command value θ* is larger than a determination value a1, and determines that the steering-angle command value θ* is not an abnormal value when the absolute value of the difference is equal to or smaller than the determination value a1 (less than the determination value a1). The determination value a1 is a maximum value that the amount of change from the previous value θ*(n−1) to the current value θ*(n) can have when the steering-angle command value θ* is a normal value, for example.

The steering-angle command value determination unit 33 sets a determination flag to abnormal when it is determined that the input steering-angle command value θ* is an abnormal value, and sets a determination flag to normal when it is determined that the input steering-angle command value θ* is not an abnormal value. The steering-angle command value determination unit 33 outputs the determination flag having been set, to the control-torque computation unit 36.

The target steering-angle compensation unit 34 determines whether a target steering angle in a predetermined n-th place read from the first storage unit 31a matches a target steering angle in the same predetermined n-th place read from the second storage unit 32, in each interpolation period Tes. More specifically, the target steering-angle compensation unit 34 reads target steering angles from the first storage unit 31a in an ascending order from the first one in each interpolation period Tes, and sets each read target steering angle as a target steering angle 1. Similarly, the target steering-angle compensation unit 34 reads target steering angles from the second storage unit 32 in an ascending order from the first one in each interpolation period Tes, and sets each read target steering angle as a target steering angle 2. The target steering-angle compensation unit 34 determines that the target steering angle 1 and the target steering angle 2 match each other when an absolute value of a difference between the target steering angle 1 and the target steering angle 2 is smaller than a determination value a2, and determines that the target steering angle 1 and the target steering angle 2 do not match each other when the absolute value of the difference is equal to or larger than the determination value a2 (more than the determination value a2). The determination value a2 is set to a minimum value of a steering angle that can be controlled by the steering mechanism or an allowable error in a target steering angle, for example.

When the target steering-angle compensation unit 34 determines that the target steering angle 1 and the target steering angle 2 match each other (the target steering angle is not an abnormal value), the target steering-angle compensation unit 34 outputs the current target steering angle 1 (or the target steering angle 2) to the subtraction circuit 35 as the final target steering angle θa* in each interpolation period Tes. On the other hand, when the target steering-angle compensation unit 34 determines that the target steering angle 1 and the target steering angle 2 do not match each other (the target steering angle is an abnormal value), the target steering-angle compensation unit 34 outputs the steering-angle command value θ* to the subtraction circuit 35 as the final target steering angle θa* in a subsequent interpolation period Tes in the predetermined period Te. Additionally, the steering-angle command value θ* has been input to the target steering-angle compensation unit 34.

The subtraction circuit 35 computes a subtraction value obtained by subtraction of the detected steering-angle value θ from the final target steering angle θa*, and outputs the computed subtraction value to the control-torque computation unit 36.

The determination flag described above is input to the control-torque computation unit 36. When the input determination flag is set to normal, the control-torque computation unit 36 performs proportional integral differential (PID) control based on the input subtraction value, to compute the control-torque command value T1* in each interpolation period Tes. On the other hand, when the input determination flag is set to abnormal, the control-torque computation unit 36 gradually decreases the control-torque command value T1* in each interpolation period Tes.

Figure 5:
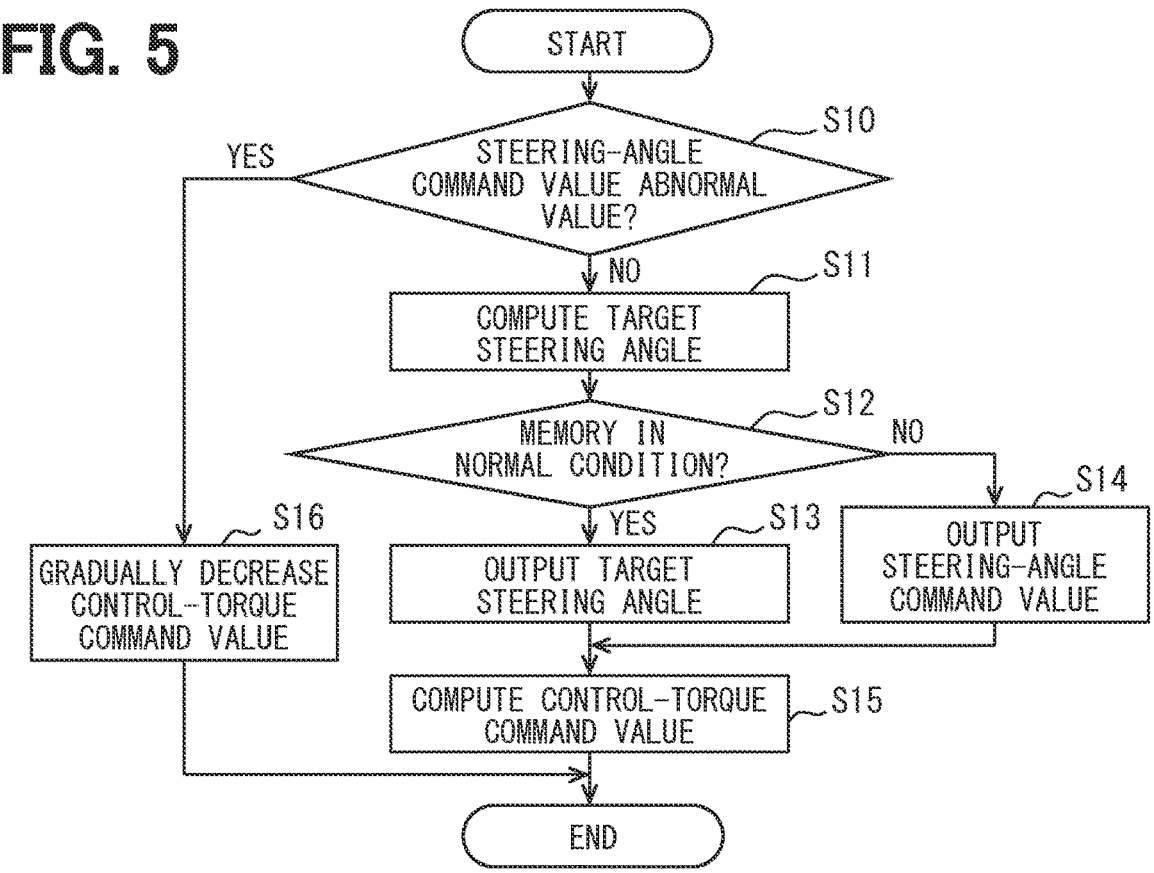
FIG. 5 is a flowchart illustrating a procedure of processes in the control-torque computation unit in FIG. 4.

FIG. 5 is a flowchart illustrating a procedure of processes in the control-torque computation unit 30 in FIG. 4. The series of processes is performed by the control-torque computation unit 30 when the host-ECU 11 inputs the steering-angle command value θ* to the control-torque computation unit 30 in each predetermined period Te.

First, it is determined whether the steering-angle command value θ* is an abnormal value (S10).

When it is determined that the steering-angle command value θ* is not an abnormal value in the determination of S10 (NO in S10), a target steering angle to be interpolated between the previous value θ*(n−1) and the current value θ*(n) of the steering-angle command value θ* is computed (S11). More specifically, a target steering angle is computed to a target steering angle changing from the previous value θ*(n−1) to the current value θ*(n) of the steering-angle command value θ* by {θ*(n)−θ*(n−1)}/N in each interpolation period Tes.

Subsequently, it is determined whether the memory in which the computed target steering angle is stored is in a normal condition (S12). Specifically, it is determined whether a target steering angle in a predetermined n-th place read from the first storage unit 31a matches a target steering angle in the same predetermined n-th place read from the second storage unit 32 in each interpolation period Tes. In this determination, when it is determined that the memory is in a normal condition (YES in S12), the current target steering angle 1 is output as the final target steering angle θa* in each interpolation period Tes (S13). On the other hand, when it is determined that the memory is not in a normal condition in the determination (NO in S12), the steering-angle command value θ* is output as the final target steering angle θa* in a subsequent interpolation period Tes in the predetermined period Te.

Subsequently, the control-torque command value T1* is computed (S15). Specifically, the control-torque command value T1* is computed by PID control based on a subtraction value obtained by subtraction of the detected steering-angle value θ from the final target steering angle θa*, in each interpolation period Tes.

On the other hand, when it is determined that the steering-angle command value θ* is an abnormal value in the determination of S10 (YES in S10), the control-torque command value T1* is gradually decreased in each interpolation period Tes (S16).

Thereafter, the series of processes is temporarily ended (END).

The process of S10 corresponds to the process performed by the steering-angle command value determination unit 33 (command-value determination unit), the process of S11 corresponds to the process performed by the steering-angle command value interpolation unit 31 (interpolation unit), the process of S12 corresponds to the process performed by the target steering-angle compensation unit 34 (interpolation-value determination unit), the processes of S13 and S14 correspond to the process performed by the target steering-angle compensation unit 34 (control unit), the process of S15 corresponds to the processes performed by the subtraction circuit 35 and the control-torque computation unit 36 (control unit), and the process of S16 corresponds to the process performed by the control-torque computation unit 36 (control unit).

In a case where the processes in FIG. 5 are repeated and the control-torque command value T1* continues to be gradually decreased in each interpolation period Tes in the process of S16, the control-torque command value T1* is gradually decreased to zero. In this case, as illustrated in FIG. 1, the motor 13 is driven based only on the assistance-torque command value T2* computed by the assistance-torque computation unit 21. Specifically, when the steering-angle command value determination unit 33 determines that the steering-angle command value θ* is not an abnormal value, the EPS-ECU 20 controls the steering mechanism based on the steering-angle command value θ* and the detected steering-torque value Ts. When the steering-angle command value determination unit 33 determines that the steering-angle command value θ* is an abnormal value, the EPS-ECU 20 controls the steering mechanism not based on the steering-angle command value θ*, but based on the detected steering-torque value Ts.

Figure 6:
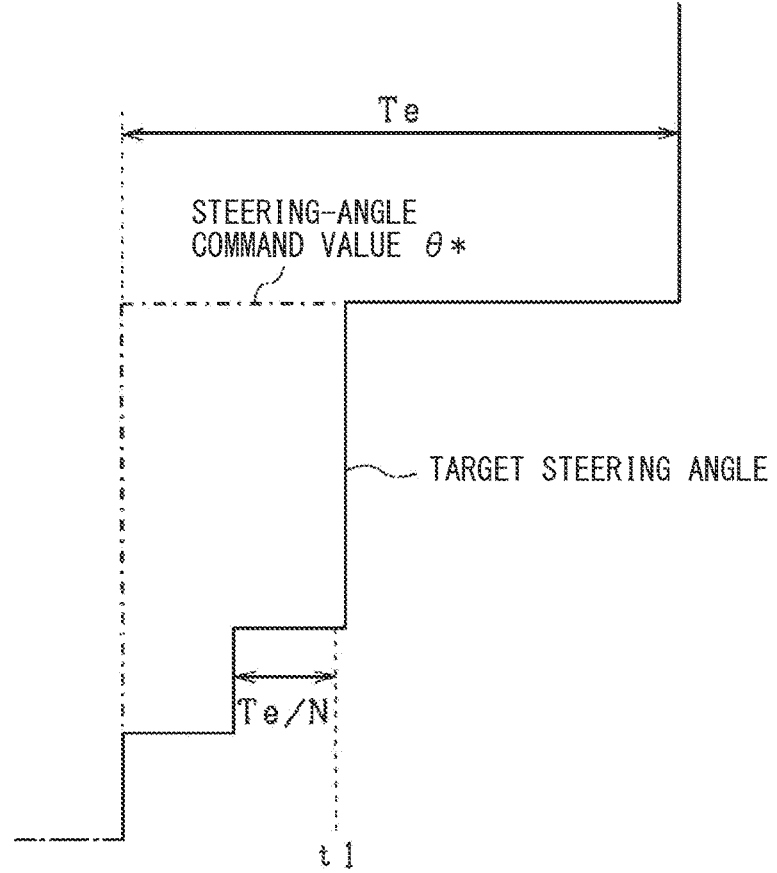
FIG. 6 is a time chart illustrating a target steering angle in a case where it is determined that a memory is not in a normal condition.

FIG. 6 is a time chart illustrating a target steering angle in a case where it is determined that a memory is not in a normal condition. When it is determined that the memory is not in a normal condition (a target steering angle has an abnormal value) at a time t1 in the predetermined period Te, the steering-angle command value θ* is output as the final target steering angle θa* in the interpolation period Tes subsequent to the time t1 in the predetermined period Te. Further, when it is determined that the memory is not in a normal condition from the beginning in the next predetermined period Te, the steering-angle command value θ* is output as the final target steering angle θa* from the beginning of the predetermined period Te.

The target steering-angle compensation unit 34, the subtraction circuit 35, the control-torque computation unit 36, the addition circuit 22, and the motor drive unit 23 form a control unit. When it is determined that a target steering angle does not have an abnormal value, the control unit controls the steering mechanism based on the target steering angle computed by the steering-angle command value interpolation unit 31. When it is determined that the target steering angle has an abnormal value, the control unit controls the steering mechanism based on a current value of the steering-angle command value θ*.

The present embodiment described above in detail has the following advantages.

The EPS-ECU 20 controls the steering mechanism based on the steering-angle command value θ* input in each predetermined period Te. The steering-angle command value interpolation unit 31 interpolates between the previous value θ*(n−1) and the current value θ*(n) of the input steering-angle command value θ*, and computes a target steering angle in the interpolation period Tes shorter than the predetermined period Te. Thus, a difference between target steering angles can be made smaller than a difference between the previous value θ*(n−1) and the current value θ*(n) of the steering-angle command value θ*

The target steering-angle compensation unit 34 determines whether a target steering angle has an abnormal value. When the target steering-angle compensation unit 34 determines that a target steering angle does not have an abnormal value, the steering mechanism is controlled based on the target steering angle computed by the steering-angle command value interpolation unit 31. Thus, a steering angle controlled by the steering mechanism can be smoothly changed.

When the target steering-angle compensation unit 34 determines that a target steering angle has an abnormal value, the steering mechanism is controlled based on the current value θ*(n) of the steering-angle command value θ*. Thus, though a change in a steering angle may probably be slightly less smooth, a steering angle controlled by the steering mechanism can be prevented from being controlled to an abnormal steering angle.

The EPS-ECU 20 includes the first storage unit 31a in which data is stored and the second storage unit 32 in which data is stored. The steering-angle command value interpolation unit 31 stores a computed target steering angle in the first storage unit 31a and the second storage unit 32. In other words, the same target steering angle computed by the steering-angle command value interpolation unit 31 is stored in the first storage unit 31a and the second storage unit 32. When the target steering-angle compensation unit 34 determines that a target steering angle in a predetermined n-th place read from the first storage unit 31a does not match a target steering angle in the predetermined n-th place read from the second storage unit 32, the target steering-angle compensation unit 34 determines that the target steering angle has an abnormal value. Thus, in a case where the first storage unit 31a or the second storage unit 32 is broken down or a trouble occurs in storage or reading of the target steering angle in/from the first storage unit 31a or the second storage unit 32, it can be determined that the target steering angle has an abnormal value. Therefore, a steering angle controlled by the steering mechanism can be prevented from being controlled to an abnormal steering angle.

When the steering-angle command value θ* is an abnormal value, it is how to control the steering mechanism based on the steering-angle command value θ* and the detected steering-torque value Ts, that matters. In this regard, when the steering-angle command value determination unit 33 determines that the steering-angle command value θ* is not an abnormal value, the EPS-ECU 20 controls the steering mechanism based on the steering-angle command value θ* and the detected steering-torque value Ts. Thus, the steering-angle command value θ* and the detected steering-torque value Ts can be reflected in control of the steering mechanism. On the other hand, when the steering-angle command value determination unit 33 determines that the steering-angle command value θ* is an abnormal value, the EPS-ECU 20 controls the steering mechanism not based on the steering-angle command value θ*, but based on the detected steering-torque value Ts. Therefore, when it is determined that the steering-angle command value θ* is an abnormal value, it is possible to continue controlling the steering mechanism based on the detected steering-torque value Ts while preventing a steering angle controlled by the steering mechanism based on the steering-angle command value θ* from being controlled to an abnormal steering angle.

The above-described embodiment can be modified as follows in practical application. The same parts as those in the above-described embodiment are denoted by the same reference signs, and thus the description thereof will be omitted.

In the control-torque computation unit 30, the second storage unit 32 may be provided in the steering-angle command value interpolation unit 31. Further, in the control-torque computation unit 30, the first storage unit 31a may be provided outside the steering-angle command value interpolation unit 31.

In the above-described embodiment, the steering-angle command value interpolation unit 31 stores a series of target steering angles changing from the previous value θ*(n−1) to the current value θ*(n) of the steering-angle command value θ*, in the first storage unit 31a and the second storage unit 32. In contrast thereto, the steering-angle command value interpolation unit 31 may compute a current value of a target steering angle in each interpolation period Tes and store only the current value of the target steering angle in the first storage unit 31a and the second storage unit 32. Then, the target steering-angle compensation unit 34 (interpolation-value determination unit) may determine whether a target steering angle read from the first storage unit 31a matches a target steering angle read from the second storage unit 32, in each interpolation period Tes.

The target steering-angle compensation unit 34 can also determine that a target steering angle has an abnormal value when an amount of change in the target steering angle from a previous value to a current value is larger than a limit value obtained by division of an absolute value of a difference between the current value θ*(n) and the previous value θ*(n−1) of the steering-angle command value θ* by the division number N, and can determine that a target steering angle does not have an abnormal value when the amount of change is equal to or smaller than the limit value (less than the limit value).

Even in a case where the target steering-angle compensation unit 34 determines that a target steering angle does not have an abnormal value, the amount of change in the target steering angle in the interpolation period Tes for computing the target steering angle may probably be unusually large. In this case, there is a fear of abrupt change in a steering angle controlled by the steering mechanism.

Then, as indicated by a broken line in FIG. 4, the steering-angle command value interpolation unit 31 may include a limiting unit 31b that limits an amount of change in the computed target steering angle in the interpolation period Tes to a limit value obtained by division of an absolute value of a difference between the current value θ*(n) and the previous value θ*(n−1) of the steering-angle command value θ* by the division number N, at maximum.

With the above-described configuration, even if an amount of change in a target steering angle in the above-described interpolation period Tes is unusually large, the amount of change can be limited to the limit value, at maximum. Thus, a steering angle controlled by the steering mechanism can be prevented from being controlled to an abnormal steering angle. The limit value is a value obtained by division of an absolute value of a difference between the current value θ*(n) and the previous value θ*(n−1) of the steering-angle command value θ* by the division number N. Therefore, an amount of change in a target steering angle can be limited to an amount of change in a case where a target steering angle is changed from the previous value θ*(n−1) to the current value θ*(n) of the steering-angle command value θ* at a constant change rate, at maximum. Therefore, in the predetermined period Te, a steering angle can be smoothly changed, and a steering angle controlled by the steering mechanism can be made as close as possible to the steering angle corresponding to the current value θ*(n) of the steering-angle command value θ*. Additionally, as the limit value, a value other than a value obtained by division of an absolute value of a difference between the current value θ*(n) and the previous value θ*(n−1) of the steering-angle command value θ* by the division number N, may be used.

Further, as a result of the above-described process performed by the limiting unit 31b, the target steering-angle compensation unit 34 can omit controlling the steering mechanism based on the current value θ*(n) of the steering-angle command value θ* when determining that a target steering angle has an abnormal value. Also in this case, a steering angle controlled by the steering mechanism can be prevented from being controlled to an abnormal steering angle. Moreover, in the predetermined period Te, a steering angle can be smoothly changed, and a steering angle controlled by the steering mechanism can be made as close as possible to the steering angle corresponding to the current value θ*(n) of the steering-angle command value θ*. The limiting unit 31b can also be provided outside the steering-angle command value interpolation unit 31.

There can be employed a configuration in which the torque command value T* (state command value) is input to the control-torque computation unit 30 from the host-ECU 11 in each predetermined period Te. In this case, the control-torque computation unit 30 includes, in place of the steering-angle command value interpolation unit 31, a torque command value interpolation unit that interpolates between a previous value T*(n−1) and a current value T*(n) of the torque command value T* input in each predetermined period Te and computes target torque in the interpolation period Tes. More specifically, the torque command value interpolation unit (interpolation unit) changes target torque from the previous value T*(n−1) to the current value T*(n) of the torque command value T* by {T*(n)−T*(n−1)}/N in each interpolation period Tes.

The control-torque computation unit 30 includes, in place of the target steering-angle compensation unit 34, the subtraction circuit 35, and the control-torque computation unit 36, a target torque compensation unit that computes the control-torque command value T1* (controls the steering mechanism) based on the target torque computed by the torque command value interpolation unit when it is determined that target torque does not have an abnormal value, and computes the control-torque command value T1* (controls the steering mechanism) based on the current value T*(n) of the torque command value T* when it is determined that target torque has an abnormal value. Also this configuration can produce effects similar to those in the above-described embodiment.

The EPS-ECU 20 can omit the assistance-torque computation unit 21 and perform only automatic control of the steering mechanism with the control-torque computation unit 30.

Although the present disclosure has been described in accordance with the embodiment, it is understood that the present disclosure is not limited to the embodiment and the configurations therein. The present disclosure also includes various modifications and modifications within the range of equivalence. In addition, various combinations and modes, and other combinations and modes including only one element, more elements, or less elements are also within the scope and idea of the present disclosure.

What is claimed is:

1. A steering-angle control apparatus configured to control a steering mechanism based on a state command value, which is input in each predetermined period, the steering-angle control apparatus comprising:
   an interpolation unit configured to interpolate between a previous value and a current value of the input state command value to compute a state interpolation value in an interpolation period, which is shorter than the predetermined period;
   an interpolation-value determination unit configured to determine whether the state interpolation value is an abnormal value; and
   a control unit configured to
      control the steering mechanism based on the state interpolation value computed by the interpolation unit when the interpolation-value determination unit determines that the state interpolation value is not an abnormal value and
      control the steering mechanism based on the current value of the state command value when the interpolation-value determination unit determines that the state interpolation value is an abnormal value.

2. The steering-angle control apparatus according to claim 1, further comprising:
   a first storage unit configured to store data; and
   a second storage unit configured to store data, wherein
   the interpolation unit is configured to store the computed state interpolation value in the first storage unit and the second storage unit, and
   the interpolation-value determination unit is configured to determine that the state interpolation value is an abnormal value when the state interpolation value in a predetermined n-th place read from the first storage unit does not match the state interpolation value in the predetermined n-th place read from the second storage unit.

3. The steering-angle control apparatus according to claim 1, wherein
   the interpolation-value determination unit is configured to
      determine that the state interpolation value is an abnormal value when an amount of change in the state interpolation value, which is computed by the interpolation unit, in the interpolation period is larger than a limit value, which is obtained by dividing an absolute value of a difference between the current value and the previous value of the state command value by a division number, the division number being a value obtained by dividing the predetermined period by the interpolation period, and
      determine that the state interpolation value is not an abnormal value when the amount of change is equal to or smaller than the limit value.

4. The steering-angle control apparatus according to claim 1, further comprising:
   a limiting unit configured to
      use, as a division number, a value obtained by dividing the predetermined period by the interpolation period and
      limit an amount of change in the state interpolation value, which is computed by the interpolation unit in the interpolation period, to a limit value obtained by dividing an absolute value of a difference between the current value and the previous value of the state command value by the division number, at maximum.

5. A steering-angle control apparatus configured to control a steering mechanism based on a state command value, which is input in each predetermined period, the steering-angle control apparatus comprising:
   an interpolation unit configured to interpolate between a previous value and a current value of the input state command value to compute a state interpolation value in an interpolation period, which is shorter than the predetermined period;
   a limiting unit configured to limit an amount of change in the state interpolation value, which is computed by the interpolation unit, in the interpolation period to a limit value, which is obtained by dividing an absolute value of a difference between the current value and the previous value of the state command value by a division number, at maximum, the division number being a value obtained by dividing the predetermined period by the interpolation period; and
   a control unit configured to control the steering mechanism based on the state interpolation value of which the amount of change is limited by the limiting unit, the state interpolation value being computed by the interpolation unit.

6. The steering-angle control apparatus according to claim 5, wherein
   the state command value is a first state command value, and
   the steering-angle control apparatus is configured to input a second state command value, which is computed separately from the first state command value,
   the steering-angle control apparatus further comprising:
   a command-value determination unit configured to determine whether the first state command value is an abnormal value, wherein
   when the command-value determination unit determines that the first state command value is not an abnormal value, the steering-angle control apparatus is configured to control the steering mechanism based on the first state command value and the second state command value, and
   when the command-value determination unit determines that the first state command value is an abnormal value, the steering-angle control apparatus is configured to control the steering mechanism not based on the first state command value, but based on the second state command value.

7. The steering-angle control apparatus according to claim 5, wherein the state command value is a steering-angle command value that indicates a steering angle to be controlled by the steering mechanism.

8. The steering-angle control apparatus according to claim 5, wherein the steering mechanism includes a mechanical unit and a motor configured to drive the mechanical unit, and the state command value is a torque command value that indicates a torque to be generated by the motor.

9. The steering-angle control apparatus according to claim 1, further comprising:

at least one processor; and a memory coupled to the at least one processor and configured to store program instructions, when executed by the at least one processor, to cause the at least one processor to provide at least: the interpolation unit; the interpolation-value determination unit; and the control unit.

10. The steering-angle control apparatus according to claim 5, further comprising:

at least one processor; and a memory coupled to the at least one processor and configured to store program instructions, when executed by the at least one processor, to cause the at least one processor to provide at least: the interpolation unit; the limiting unit; and the control unit.

* * * * *